(12) United States Patent
Chugh et al.

(10) Patent No.: US 10,273,689 B2
(45) Date of Patent: *Apr. 30, 2019

(54) PANEL AND METHOD FOR FABRICATING, INSTALLING AND UTILIZING A PANEL

(71) Applicants: Punit Chugh, East Hampton, NY (US);
John Fisher, Ronkonkoma, NY (US);
Bill Chaleff, East Hampton, NY (US)

(72) Inventors: Punit Chugh, East Hampton, NY (US);
John Fisher, Ronkonkoma, NY (US);
Bill Chaleff, East Hampton, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/128,896

(22) Filed: Sep. 12, 2018

(65) Prior Publication Data

US 2019/0010699 A1    Jan. 10, 2019

Related U.S. Application Data

(60) Division of application No. 15/639,132, filed on Jun. 30, 2017, now Pat. No. 10,145,108, which is a
(Continued)

(51) Int. Cl.
*E04C 2/52*     (2006.01)
*E04B 2/72*     (2006.01)
(Continued)

(52) U.S. Cl.
CPC ............... *E04C 2/521* (2013.01); *B32B 3/30* (2013.01); *B32B 7/12* (2013.01); *E04B 1/90* (2013.01); *E04B 2/721* (2013.01); *E04C 2/243* (2013.01); *E04C 2/28* (2013.01); *E04C 2/284* (2013.01); *E04C 2/292* (2013.01); *E04C 2/296* (2013.01); *E04C 2/322* (2013.01); *E04C 2/326* (2013.01);
(Continued)

(58) Field of Classification Search
CPC . E04C 2/521; E04C 2/243; E04C 2/28; E04C 2/284; E04C 2/322; E04C 2/34; E04C 2/46; E04C 2/526; E04C 2/326; E04C 2/292; E04C 2/296; E04C 2002/001; E04B 1/90; E04B 1/0023; E04B 1/6116; E04B 2/721; E04B 2001/6195; E04D 3/357; E04F 13/0885; B32B 3/30; B32B 7/12; B32B 2307/304; B32B 2607/00
See application file for complete search history.

(56) References Cited

U.S. PATENT DOCUMENTS 3,222,697 A    12/1965  Scheermesser
5,104,715 A     4/1992  Cruz
(Continued)

FOREIGN PATENT DOCUMENTS

EP           0041604        12/1981
JP       2000087488 A   *   3/2000
WO  PCT/US2017/028834        8/2017

*Primary Examiner* — Jeanette E Chapman

(57) ABSTRACT

The insulating barrier of a panel including has a first stratum and a second stratum, each having a plurality of ridges that face each other, and run athwart of each other. Clearance between at least some adjacent pairs of the ridges provide a mechanical chase that reaches across at least most of the panel. A cladding overlaying at least one side of the insulating barrier is denser than the barrier. The mechanical chase is in the form of a groove through which a utility feed can be routed when the panel is to be mounted in a building.

3 Claims, 6 Drawing Sheets

Related U.S. Application Data continuation-in-part of application No. 15/152,855, filed on May 12, 2016, now Pat. No. 9,725,902.

(51) Int. Cl.

| | |
|---|---|
| *E04C 2/32* | (2006.01) |
| *E04F 13/08* | (2006.01) |
| *B32B 3/30* | (2006.01) |
| *B32B 7/12* | (2006.01) |
| *E04B 1/90* | (2006.01) |
| *E04C 2/24* | (2006.01) |
| *E04C 2/28* | (2006.01) |
| *E04C 2/34* | (2006.01) |
| *E04D 3/35* | (2006.01) |
| *E04C 2/292* | (2006.01) |
| *E04C 2/296* | (2006.01) |
| *E04C 2/284* | (2006.01) |
| *E04B 2/00* | (2006.01) |
| *E04C 2/00* | (2006.01) |
| *E04B 1/00* | (2006.01) |
| *E04B 1/61* | (2006.01) |

(52) U.S. Cl.
CPC ............... *E04C 2/34* (2013.01); *E04C 2/46* (2013.01); *E04C 2/526* (2013.01); *E04D 3/354* (2013.01); *E04D 3/357* (2013.01); *E04F 13/0885* (2013.01); *B32B 2307/304* (2013.01); *B32B 2607/00* (2013.01); *E04B 1/0023* (2013.01); *E04B 1/6116* (2013.01); *E04B 2001/6195* (2013.01); *E04C 2002/001* (2013.01)

(56) References Cited

U.S. PATENT DOCUMENTS

2004/0111997 A1   6/2004  Gigiakos
2005/0241267 A1\* 11/2005  Wu .......................... B27D 1/06
                                            52/783.11
2012/0047839 A1   3/2012  Walker \* cited by examiner

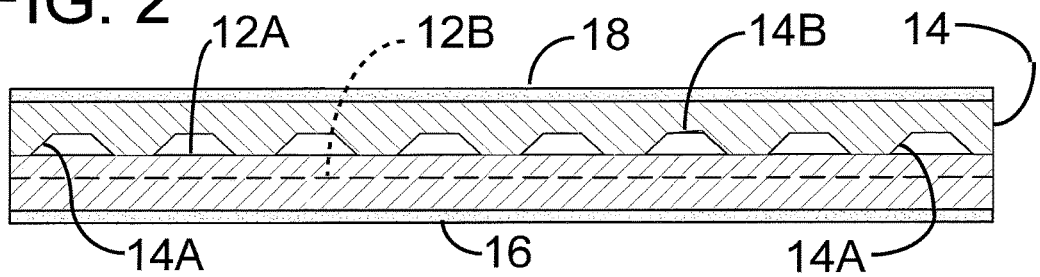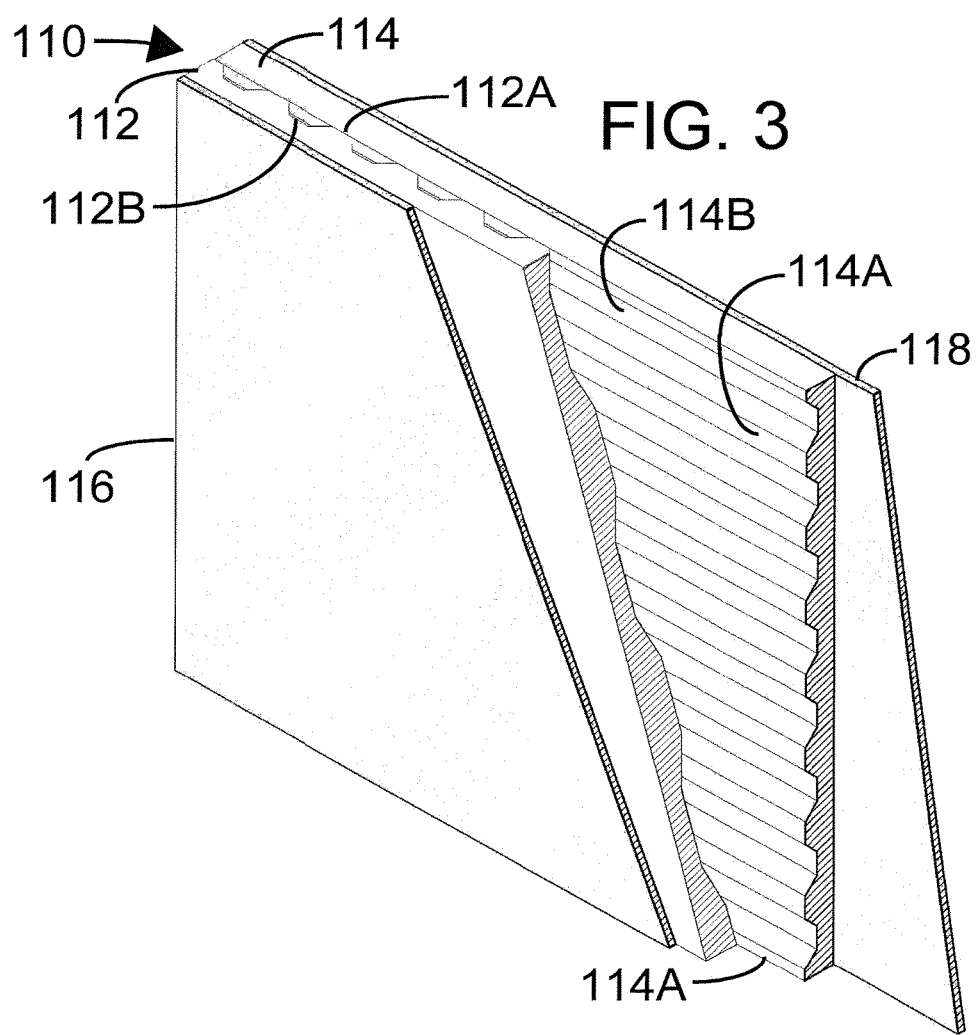

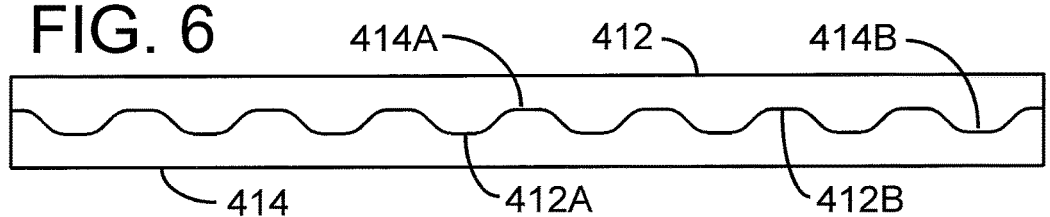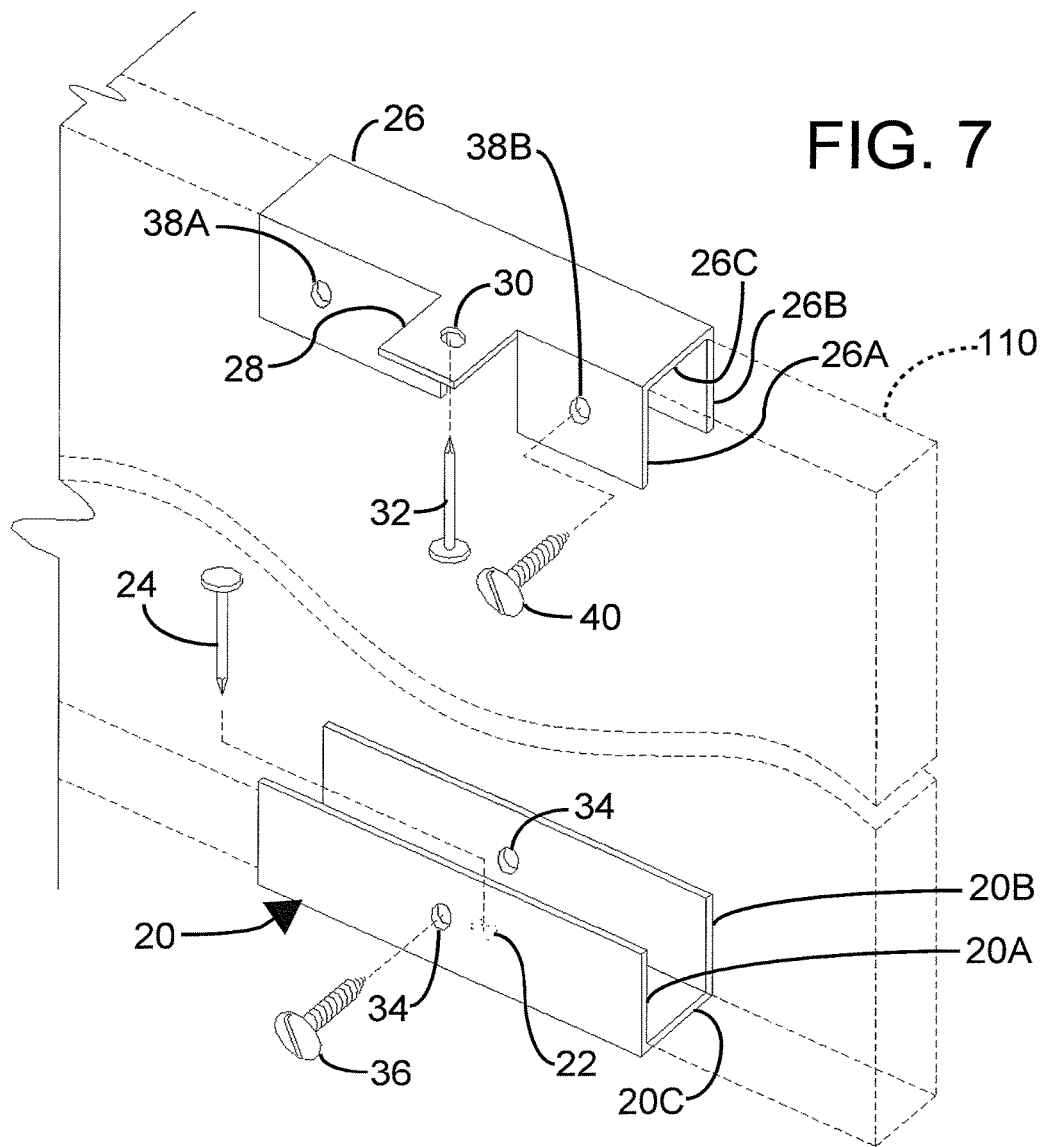

PANEL AND METHOD FOR FABRICATING, INSTALLING AND UTILIZING A PANEL

CROSS-REFERENCES TO RELATED APPLICATIONS

This application is a divisional application based on U.S. application Ser. No. 15/639,132, filed 30 Jun. 2017, which is in turn a continuation in part U.S. patent application Ser. No. 15/152,855, filed 12 May 2016, the contents of both prior applications are hereby incorporated by reference herein.

BACKGROUND OF THE INVENTION

1. Field of the Invention

The present invention relates to non load-bearing partitions used in buildings, and in particular, to panels and panel methods involving panels with multiple layers.

2. Description of Related Art

The building of interior walls and other non-load-bearing walls is fairly time-consuming. A traditional method is nailing wooden top plates and bottom plates to ceilings and floors, respectively, before nailing to them a number of spaced, parallel studs. Plumbing and electrical lines are then routed through holes drilled in the studs, headers, and footers. This arrangement can then be covered with sheetrock (gypsum drywall) with apertures that allow access to the plumbing and electrical lines as needed.

In some settings, the studs, headers, and footers may be steel framing members especially adapted for this purpose. The metal studs may have punched holes to provide chases for utility lines (plumbing and electrical). Again, sheetrock can be installed over the metal studs with apertures to allow access to plumbing and electrical lines as needed.

These types of walls and partitions easily transmit sound. For this reason builders may install sound deadening material inside the wall or place such material on one of the surfaces of the wall.

Boards made from a magnesium oxide mineral (MgO boards) are sometimes used instead of sheetrock, and are sometimes used in exterior applications. MgO boards are fairly waterproof, fire resistant, and resistant to mold, fungus, and insects.

Structural insulated panels (SIPs) are commercially available and typically employ an insulating foam core sandwiched between facings made of oriented strand board (OSB).

See also U.S. Pat. Nos. 4,559,263; 4,572,857; 5,104,715; 5,351,454; 5,792,552; and 6,599,621; as well as US Patent Application Publication Nos. 2011/0268916; and 2015/0052838.

SUMMARY OF THE INVENTION

In accordance with the illustrative embodiments demonstrating features and advantages of the present invention, there is provided a panel including an insulating barrier having an opposing pair of sides. The insulating barrier includes a first stratum and a second stratum having a first plurality of ridges and a second plurality of ridges, respectively. The first and the second plurality of ridges face each other. The first plurality of ridges runs athwart the second plurality of ridges. One or more adjacent pairs of the first plurality of ridges have between them clearance providing a mechanical chase across at least most of the panel. The panel also includes a cladding overlaying the insulating barrier on at least one of the opposing pair of sides. The cladding has a density exceeding that of the first and the second stratum.

In accordance with another aspect of the invention, a method is provided for utilizing a panel to be fabricated from a first material and a second material. The method includes the step of forming from the first material a pair of strata each having a plurality of ridges. Another step is attaching the plurality of ridges of one of the pair of strata to the plurality of ridges of the other one of the pair of strata, with the plurality of ridges of one of the pair of strata transverse to the plurality of ridges of the other one of the pair of strata. The method also includes the step of externally cladding the pair of strata using the second material.

In accordance with yet another aspect of the invention, a method is provided for installing a utility feed in a cladded panel having a central pair of strata each with parallel grooves. The grooves of one of the pair of strata being opposed and transverse to the grooves of the other one of the pair of strata. The method includes several steps, performed in any order. One step is mounting the cladded panel in a building structure. Another step is routing the utility feed along one of the grooves of one of the pair of strata.

In accordance with still yet another aspect of the invention, a method is provided for fabricating a panel from a first material and a denser second material. The method includes the step of forming from the first material a first strata and a second strata, each having an inside portion and an outside portion. The inside portion of the first and the second stratum are formed into a first plurality of ridges and a second plurality of ridges, respectively. The outside portion of the first stratum is formed with an externally flat unbreached layer supporting and being formed of the same, first material as the first plurality of ridges. The outside portion of the second stratum is an externally flat unbreached layer supporting and being formed of the same, first material as the second plurality of ridges. The method also includes the step of attaching the first plurality of ridges of the first strata to the second plurality of ridges of the second strata with each of the ridges of the first stratum extending to meet more than one of the plurality of ridges of the second stratum. The first and the second plurality of ridges are oriented to face each other with the first plurality of ridges running athwart the second plurality of ridges. The first and the second plurality of ridges are oriented to furnish between them clearance that provides a mechanical chase across at least most of the panel. The method also includes the step of externally cladding at least one of the first and the second strata using the second material.

In accordance with still yet another and further aspect of the invention, a panel is provided including an insulating barrier having an opposing pair of sides. The insulating barrier includes a first stratum and a second stratum each having an inside portion and an outside portion. The inside portion of the first and the second stratum have a first plurality of ridges and a second plurality of ridges, respectively. Each of the ridges of the first stratum extend to meet more than one of the plurality of ridges of the second stratum. The outside portion of the first stratum is an externally flat unbreached layer supporting and being formed of the same material as the first plurality of ridges. The outside portion of the second stratum is an externally flat unbreached layer supporting and being formed of the same material as the second plurality of ridges. The first and the second plurality of ridges face each other. The first plurality of ridges run athwart the second plurality of ridges.

One or more adjacent pairs of the first plurality of ridges have between them clearance providing a mechanical chase across at least most of the panel. The panel also includes a cladding overlaying the insulating barrier on at least one of the opposing pair of sides. The cladding has a density exceeding that of the first and the second stratum. Also included is a plurality of cleats edge-mounted to embrace the insulating barrier without embracing the cladding. The plurality of cleats each includes a U-shaped channel, the plurality of cleats being adapted to be attached to an adjoining structure By employing apparatus and methods of the foregoing type an improved panel and panel techniques are achieved. In some embodiments, a foam insulating barrier is cladded on opposite sides by a denser material, for example, MgO boards, sheet metal, vinyl, sheetrock, etc. The cladding can be held in place by adhesives, or by other means.

A disclosed foam insulating barrier is formed of two strata, each with a plurality of spaced, parallel ridges. The ridges of one stratum faces and is perpendicular to the ridges of the other stratum. The ridges of the two strata can be attached together by adhesives or by other means.

The disclosed panel can be installed inside a building without the need for conventional framing (studs, and plates). This panel can be installed using U-shaped, metal tracks on the top and bottom of the panel. The disclosed bottom track can be nailed, screwed, or adhesively secured in place before sliding the panel into the track. The disclosed upper track can be similarly installed and the disclosed embodiment may or may not have an outwardly projecting tab with a fastener hole. This upper track can be positioned atop the panel before securing the track. The panel itself can be held in place with fasteners or by adhesive means.

The clearance between adjacent ridges of each of the two strata provides a groove that can be used as a mechanical chase for utility feeds such as plumbing or electrical wiring. Because the ridges of the two strata are transverse, the utility feeds can be routed either vertically or horizontally, depending on which grooves of the two strata are utilized.

Panels of this type will also have a degree of soundproofing or sound deadening qualities. The foam core by itself has some acoustical attenuating properties. In addition, the transverse ridges of the opposing foam strata reduces the surface contact between the strata to a number of relatively small points, thereby greatly reducing the ability of sound to travel from one stratum to the other.

BRIEF DESCRIPTION OF THE DRAWINGS

The above brief description as well as other objects, features and advantages of the present invention will be more fully appreciated by reference to the following detailed description of illustrative embodiments in accordance with the present invention when taken in conjunction with the accompanying drawings, wherein:

FIG. 2 is a cross-sectional view of the panel of FIG. 1, shown assembled;

FIG. 3 is a perspective view of a panel of that is dimensioned differently than that of FIG. 1, and is shown assembled, and with portions broken away for illustrative purposes;

FIG. 6 is an end view of components that are an alternate to that of FIG. 4A;

FIG. 7 is a perspective view of tracks used to install one of the panels of FIGS. 1-6, with the panel shown in phantom and with portions broken away for illustrative purposes;

DETAILED DESCRIPTION

Figure 1:
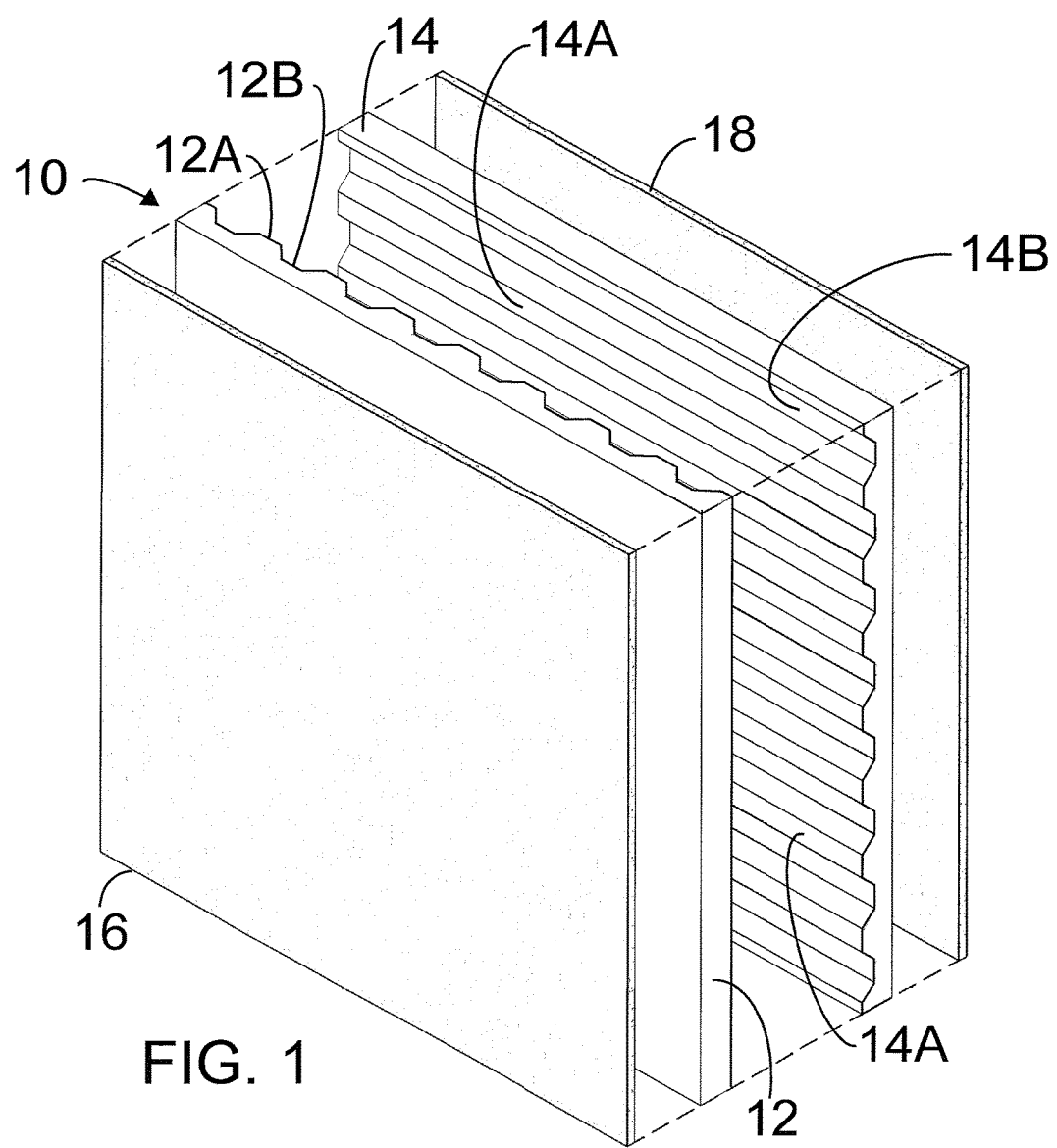
FIG. 1 is an exploded, perspective view of a panel in accordance with principles of the present invention.

Referring to FIGS. 1 and 2, the constituent components of panel 10 are shown as rectangular external layers 16 and 18, and internal strata 12 and 14 (these strata are also referred to as the first and second stratum). Layers 16 and 18 (each layer also referred to as cladding) may be MgO board (board made with a mineral based material, namely magnesium oxide). Instead of MgO board, some embodiments may use gypsum wallboard, cementitious board, sheet metal, plywood, other wood composites such as OSB, etc. Some embodiments will use mass-loaded vinyl for sound proofing purposes.

When used, the gypsum wallboard may be plain with paint or fabric or vinyl finishes. When used, the sheet metal may be of various gauges with any of a variety of coatings and finishes. In some embodiments layer 16 can be made of different material than layer 18, e.g. wallboard on one side and MgO board on the other. In still other embodiments, one of the layers 16 or 18 can be eliminated.

In this embodiment the height and width of components 12, 14, 16, and 18 are the same, i.e. they have a square outline. It will be appreciated that outlines with proportions other than a square outline will be more prevalent.

Strata 12 and 14 (referred to collectively as an insulating barrier) are fabricated from a rigid foam material made from substances such as polyurethane, polyisocyanurate, polystyrene, EPS (expanded polystyrene), etc. A variety of other materials are feasible, and good results are achieved when external layers 16 and 18 are denser than strata 12 and 14. Strata 12 and 14 may be fabricated by extrusion, molding, or other fabrication processes.

The inside face of strata 14 is corrugated and has a plurality of parallel ridges 14A, in this embodiment nine such ridges, shown as flat peaks parallel to the back of stratum 12. Eight grooves 14B are interleaved with ridges 14A. Grooves 14B have a floor, shown as a flat valley parallel to the back of stratum 14. Except for the outermost ridges, ridges 14A have a common polygonal cross-section; namely, a symmetrical trapezoidal shape with slanted sides converging to a flat top. The two outermost of the ridges 14A are truncated; that is, their cross-sections are halved along a longitudinally disposed plane that is transverse to layers 16 and 18.

Since panel 10 has a square outline, stratum 12 may be identical to stratum 14. Therefore, stratum 12 will also have nine ridges 12A with eight grooves 12B between them. However, ridges 12A have been rotated 90° and are therefore transverse to ridges 14A. Thus in FIG. 1 ridges 12A are vertical, while ridges 14A are horizontal.

Using this orientation, strata 12 and 14 are cemented together as shown in FIG. 2. Basically, the nine ridges 12A will have 81 intersections with the nine ridges 14A. Ridges 12A and 14A may be secured together at these intersections with structural adhesives, and general purpose adhesives such as a polyurethane adhesive, cyanoacrylate adhesive, epoxy, polyisocyanurate adhesive, etc.

In this embodiment, the tops of ridges 12A and 14A, and the floors (flat valleys) of grooves 12B and 14B will each be 1⅞" (4.76 cm) wide. The height of ridges 12A and 14A (and thus the depth of grooves 12B and 14B) will each be 1⅛" (2.86 cm). With these dimensions, the ridge to ridge spacing will be 4 inches (10 cm). The overall thickness of strata 12 and 14 is 2¾" (7 cm) and thus when stacked transversely, the overall thickness of the stack is 5½" (14 cm). This thickness is comparable to the larger dimension of a 2×6 stud (whose nominal dimension is actually 5½" or 14 cm).

It will be appreciated that these ridges 12A and 14A and grooves 12B and 14B may have different dimensions and different shapes in other embodiments.

Cladding 16 and 18 can be secured to the outsides of strata 12 and 14, respectively, by adhesives similar to those used to secure the strata together. Thus, the four components of panel 10 are permanently secured together and can be sold as a single, rigid unit.

Referring to FIG. 3, panel 110 is approximately 4'×8' (1.2 m×2.4 m) and is longer than the previously illustrated panel, which was approximately a 4 foot square (1.2 m square). In some cases panel 110 will be 4 feet×10 feet (1.2 m×3 m), or 4 feet by 12 feet (1.2 m×3.7 m). Components in this Figure corresponding to those of FIG. 1 have the same reference numerals but increased by 100.

In this embodiment, stratum 114 has the same cross-section as previously mentioned stratum 14, but is twice as long, i.e. 8 feet long (2.4 m long). Stratum 112 is twice as wide and therefor has a greater number of ridges 112A. While one can create stratum 112 by butting together two of the previously mentioned strata (strata 12 of FIG. 1), better structural integrity will be achieved by fabricating stratum 112 as a single molded or extruded unit. Note that the number of ridges 112 does not precisely double because at the midline two smaller (halved) ridges form one ridge to create a total of seventeen ridges.

Figure 4A:
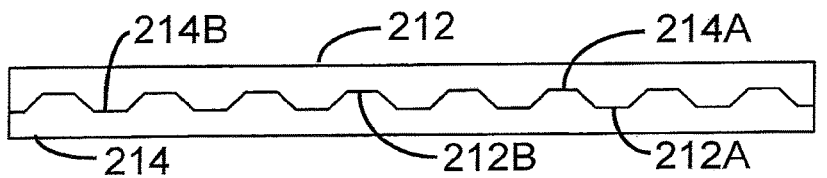
FIGS. 4A-4C are end views showing steps in forming and assembling components that can be used to make panels similar to that of FIG. 2.
Figure 4B:
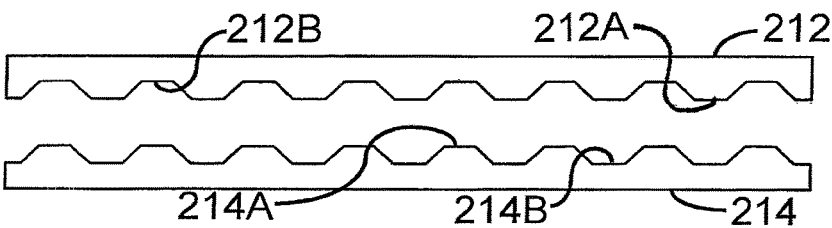
Figure 4C:
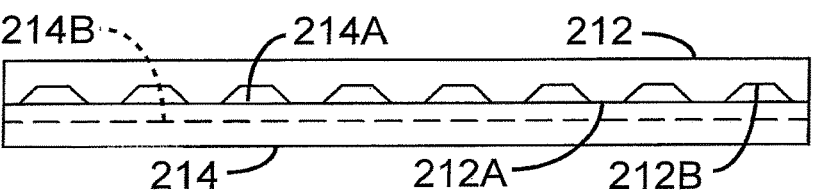

FIGS. 4A-4C describe a technique for making strata 212 and 214. In FIG. 4A strata 212 and 214 are shown as complementary slabs that can be separated to form ridges 212A and 214A, respectively. This separation can be achieved by passing a single rectangular slab through a corrugated blade that will cut the ridges 212A and 214A. Alternatively, strata 212 and 214 can be separately fabricated by extrusion, cutting, or molding. In either case, two separate strata are achieved as shown in FIG. 4B.

In FIG. 4C stratum 214 has been rotated 90° relative to strata 212 to form an insulating barrier that can serve as a foam core for a panel of the type previously described.

The foregoing assumes a square panel, but this technique can be employed to create panels with different proportions. For example, for a 4'×8' panel, one would double the width of the profile shown in FIG. 4A, effectively doubling the number of ridges 214A. One would then split one stratum (e.g. stratum 214) in half longitudinally (parallel to the ridges), and split the other stratum (e.g. stratum 212) in half transversely (perpendicular to the ridges). Then each of the longitudinally split strata would be paired with of one the transversely split strata, with their respective ridges rotated 90° as before.

For a 4'×12' panel, the profile of FIG. 4A would be tripled. Then, one stratum would be split longitudinally into three parts, while the other stratum would be split transversely into three parts. For a 4'×10' panel a similar splitting can be used (quintupling and then splitting one stratum into a 5×2 matrix, and the other stratum into a 2×5 matrix).

FIG. 4C shows the rotated strata secured together to produce an insulating barrier that is 5½" thick (14 cm thick). This thickness is consistent with a 2×6 stud.

Figure 5A:
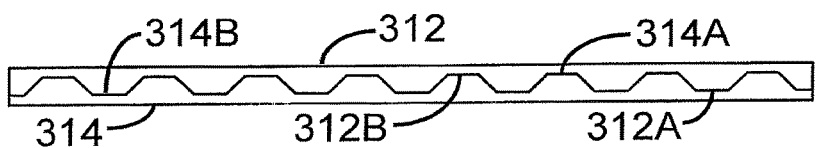
FIGS. 5A-5C are end views showing steps in forming and assembling components of a panel that is an alternate to that of FIG. 2.
Figure 5B:
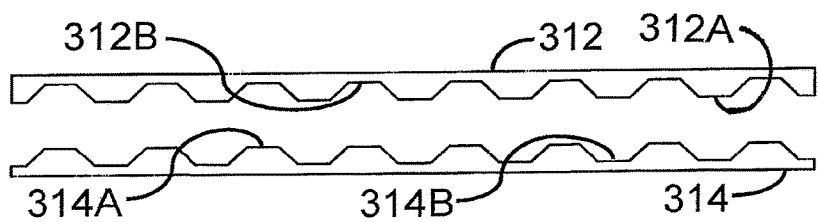
Figure 5C:
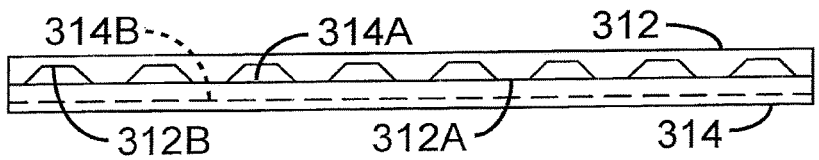

In the embodiment of FIGS. 5A-5C, strata 312 and 314 have been scaled down, and have the same reference numerals but increased by 100.

Basically, when strata 312 and 314 have been rotated 90° and secured together as shown in FIG. 5C the overall thickness is 3½", which is consistent with a 2×4 stud (whose larger dimension is actually 3½ inches, or 9 centimeters).

In this embodiment ridges 312A and 314A, and grooves 312B and 314B have the same width and pitch as before, but now have a height and depth of 1⅛" (2.8 cm).

Referring to FIG. 6, this embodiment is much like that of FIG. 4, and components corresponding thereto have the same reference numeral but increased by 200. In FIG. 6 the cross sections of ridges 412A and 414A are no longer polygonal but have curved sides. This sinuous profile is essentially a sinusoid with clipped amplitudes.

Referring to FIG. 7 previously mentioned panel 110 is shown installed inside a building in tracks 20 and 26. Track 20 is a U-shaped channel with parallel walls 20A and 20B interconnected by web 20C. Track 20 is sized to embrace the lower edge of panel 110 on the outside, or with its upstanding walls 20A and 20B inserted between the core components (core 12.14 of FIG. 1) and the skin components (skin components 16 and 18 of FIG. 1).

Web 20C has a fastener hole 22 and nail 24 is shown about to be driven through that hole into the floor or floor joists, although in some cases a screw or other fastener can be used instead. In some cases the fastener 24 is driven through the center of the track 20 with the panel 110 being inserted afterwards. Walls 20A and 20B each have a fastener hole 34. Screw 36 is shown about to be driven through the hole 34 in wall 20A to hold panel 110 in place, although a nail or fastener can be used instead.

Upper track 26 is also shown as a U-shaped channel having a parallel pair of walls 26A and 26B interconnected by web 26C. A tab 28 is punched out of the middle of wall 26A, and is coplanar with web 26C. Fastener holes 38A and 38B are formed in wall 26A on opposite sides of tab 26A. Screw 40 is shown about to be driven through hole 38B to secure panel 110 in place (although a nail can be used instead of screw 40).

Tab 28 has a fastener hole 30, and nail 32 is shown about to be driven through this hole to secure track 26 to the ceiling rafters or joists. Again, a screw or other fastener can be used instead of a nail.

While a single, relatively short track 20 is shown along the bottom of panel 110, in many cases multiple sections of tracks will be used to hold the panel more securely. Alternatively, track 20 can be made relatively long with a number of fastener holes to hold panel 110 securely. Likewise, a number of track sections identical to track 26 can be installed across the top of panel 110, or the track can be lengthened and provided with a number of fastener holes.

Instead of, or in addition, the foregoing fasteners, the installation may be performed with non-hardening acoustical sealant or foam tape. In some embodiments this sealant or tape can be used on opposite sides of web 20C to secure the web to the floor and to panel 110. Such sealant or tape can also be used to secure track 26 to the ceiling, in which case the track 26 need not be manufactured with fastening tab 28, and can instead be a simple U-shaped channel, identical to channel 20.

Figure 8:
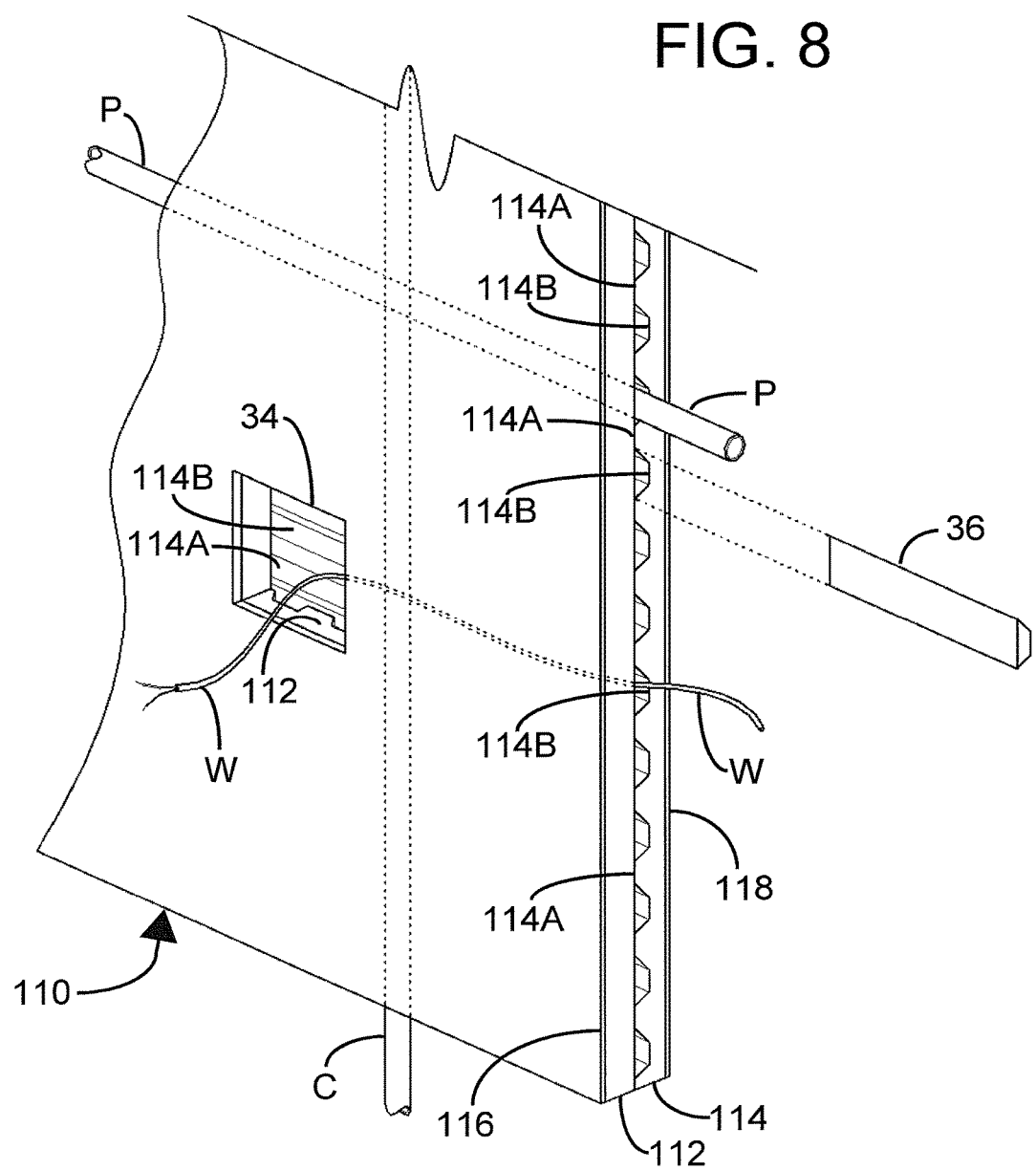
FIG. 8 is a perspective view of the panel of FIG. 3 with portions broken away for illustrative purposes, and with various utility feeds installed and with a spline being installed.

Referring to FIG. 8, panel 110 has been installed as previously described in connection with FIG. 7. As part of this installation, one of the horizontal grooves 114B is being used as a mechanical chase, through which pipe P is routed. Pipe P may be part of a plumbing arrangement, for example, a water utility feed. In other cases pipe P may be a metal conduit through which electrical wires are routed. In still other cases pipe P may carry natural gas for a stove, dryer, furnace, etc. In still other cases, pipe P may constitute electrical wiring, telephone lines, cable television lines, etc As previously described, stratum 112 has a number of vertical grooves (grooves 112B of FIG. 3), and routed through one of those grooves is a conduit C. Conduit C is a drain to a sanitary sewer, although in some cases the conduit may be a vent, a water feed line, a natural gas line, electrical wiring, telephone lines, cable television lines, etc. Because the grooves in strata 112 and 114 do not overlap, separate elements can cross over each other inside panel 110 in the vertical and horizontal directions.

Electrical wiring W is routed through another one of the grooves 114B in stratum 114. This wiring W emerges through a hole 34 cut through stratum 112 to provide access to groove 114B. Hole 34 can be cut either before or after panel 110 is installed in place. An electrical outlet may be installed in hole 34 in the usual fashion, although this method may be used for installing an electrical switch or other electrical devices.

In this embodiment, an installer wishes to install a second identical panel (i.e., a complementary member), edge to edge with panel 110. For this reason, spline 36 is shown about to be inserted into one of the grooves 114B. Spline 36 has a matching cross-section, that is, a trapezoidal cross-section. Spline 36 will be inserted halfway into groove 114B and may be held in place by a fastener (not shown) driven through stratum 112 or 114 into the spline. In some cases an adhesive may be used instead of a fastener. Next, a second panel similar to panel 110 will be slid into position such that the exposed portion of spline 36 will slide into a matching groove in the incoming panel. Spline 36 may be secured in the second panel via fasteners or adhesives.

As a practical matter, utility feeds P and W will be installed after the second panel is in place, so that these feeds may be simultaneously routed through both panels.

While one spline 36 is illustrated, in some embodiments multiple splines may be used at the vertical joint between adjoining panels.

Panels of the foregoing type have numerous advantages. The panels have inherent rigidity and structural strength so that they can be readily used in a building, particularly for non-load-bearing, internal walls or walls that do not constitute the support structure of the building. As just described, installation can proceed without the need for conventional framing (studs, and top and bottom plates).

Also, the panel has intrinsic mechanical chases that facilitate the installation of utility feeds (plumbing, electrical, gas, telephone, etc.), as well as drains and vents. In addition the panel can be made with materials that are inherently waterproof, fire resistant, and resistant to mold, fungus and insects. Also, the foam core and the air trapped between the foam strata provide good thermal insulating properties.

The panels will also have a degree of soundproofing or sound deadening qualities. The above described foam core by itself has some acoustical attenuating properties. In addition, the transverse ridges of the opposing strata reduce the surface contact between the strata to a number of small points, thereby greatly reducing the ability of sound to travel from one stratum to the other. Furthermore, securing the panel with non-hardening acoustical sealant, gaskets, or foam tape avoids transmitting sound between rooms separated by the ceiling or floor, into the panel.

Figure 9:
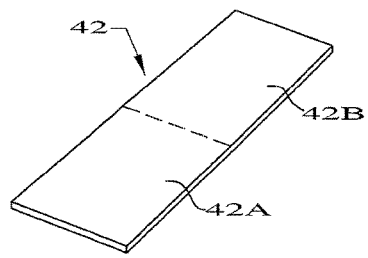
FIG. 9 is a perspective view of an insert that is used with two panels of the type shown in FIGS. 1-6.
Figure 10:
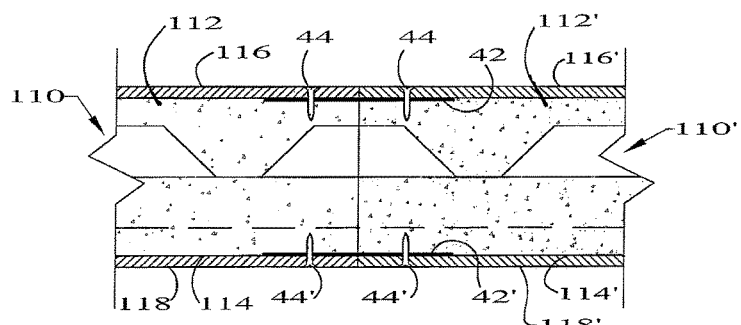
FIG. 10 is cross-sectional view of the insert of FIG. 9 being used with two panels of the type shown in FIGS. 1-6.

Referring to FIGS. 9 and 10, previously mentioned panel 110 of FIG. 2 is shown abutting another panel 110', edge to edge. Panels 110 and 110' are identical, and panel 110' has the same reference numerals but marked with a prime ('). Panel 110' is also referred to as a complimentary member with a complimentary barrier 112'/114' clad with complementary material 116' and 118'. Panels 110 and 110' are secured together with a pair of inserts: insert 42 (FIGS. 9 and 10) and identical insert 42'. Inserts 42 and 42' may be a flat strip of the sheet metal, plastic, a structural composite, thin plywood, etc.

Insert 42 is considered divided into two contiguous wings 42A and 42B. One of those wings (e.g. wing 42A) will be tapped into place between cladding 116 and stratum 112 of panel 110 into the position illustrated. Once in place, this embedded wing can be fastened by driving self-tapping screw 44 through cladding 116 and into insert 42. Next, one wing of insert 42' can be tapped into place between cladding 118 and stratum 114 and screwed in place with self-tapping screw 44'.

Additional inserts can be fastened in place along the edge of panel 110 with the insert to insert spacing chosen to achieve the desired connection strength between panels 110 and 110'. Alternatively, inserts 42 and 42' may be elongated strips that cover a large portion of the entire edges of panels 110 and 110'.

Next panel 110' is aligned with panel 110 with insert 42 aligned with the joint between cladding 116' and stratum 112' and insert 42' aligned with the joint between cladding 118' and stratum 114'. Thereafter, panel 110' may be pushed or tapped to embed inserts 42 and 42' as illustrated, before securing them by driving self-tapping screws 44 and 44' through the inserts.

Figure 11:
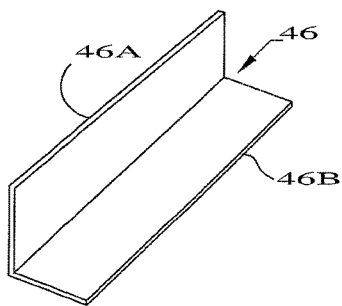
FIG. 11 is a perspective view of an insert that is an alternative to that shown in FIG. 9.
Figure 12:
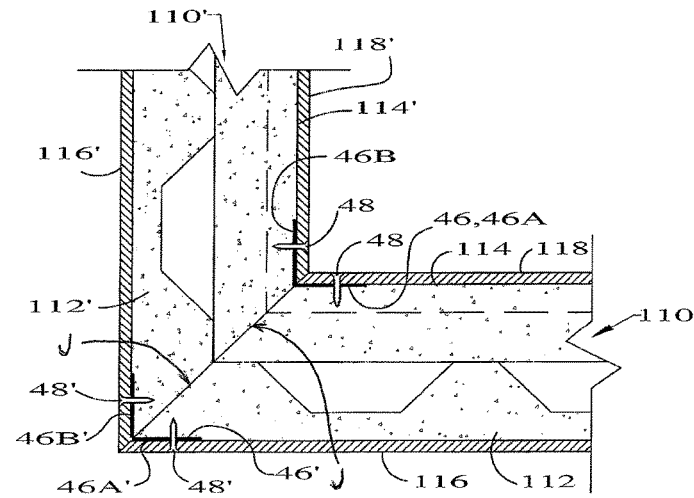
FIG. 12 is cross-sectional view of the insert of FIG. 11 being used with two panels of the type shown in FIGS. 1-6.

Referring to FIGS. 11 and 12, an edge of previously mentioned panel 110 of FIG. 2 is shown bevelled and placed next to the bevelled edge of another panel 110', to form a miter or bevel joint J. While this joint J places panels 110 and 110' at right angles, the panels can be oriented at any practical, desired angle. Panels 110 and 110' are the same, and panel 110' has the same reference numerals but marked with a prime ('). Panel 110' is also referred to as a complimentary member with a complimentary barrier 112'/114' clad with complementary material 116' and 118' Panels 110 and 110' are secured together with a pair of inserts that are shaped like angle irons, specifically: insert 46 (FIGS. 11 and 12) and identical insert 46'. Insert 46 may be a strip of sheet metal, plastic, a structural composite, thin plywood, etc., which is bent or fashioned into perpendicular wings 46A and 46B (or some other angle as needed to accommodate the two panels).

One of those wings of insert 46 (e.g. wing 46A) will be tapped into place between cladding 118 and stratum 114 of panel 110 into the position illustrated. Once in place, this embedded wing can be fastened by driving self-tapping screw 48 through cladding 118 and into insert 46. Next, one wing of insert 46' can be tapped into place between cladding 116 and stratum 112 and screwed in place with self-tapping screw 48'.

Additional inserts can be fastened in place along the edge of panel 110 with the insert to insert spacing chosen to achieve the desired connection strength between panels 110 and 110'. Alternatively, inserts 46 and 46' may be elongated strips that cover almost the entire edges of panels 110 and 110'.

Next panel 110' is aligned with panel 110 with wing 46B of insert 46 aligned with the joint between cladding 118' and stratum 114' and wing 46B of insert 46' aligned with the joint between cladding 116' and stratum 112'. Thereafter, panel 110' may be pushed or tapped to embed inserts 42 and 42' as illustrated, before securing them by driving self-tapping screws 48 and 48' through the inserts.

Figure 13:
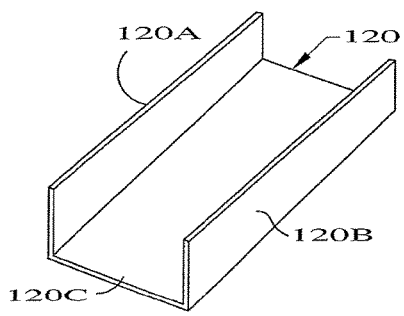
FIG. 13 is a perspective view of a track that is an alternative to that shown in FIG. 7.
Figure 14:
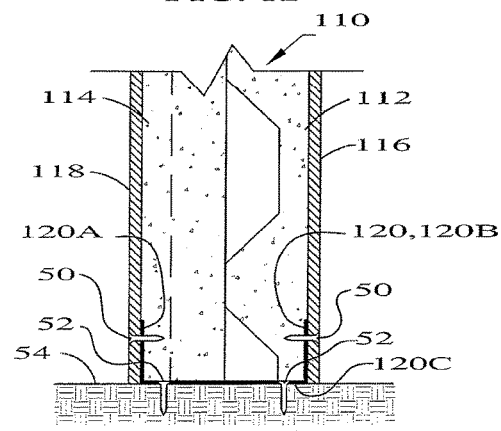
FIG. 14 is cross-sectional view of the track of FIG. 13 being used with a panel of the type shown in FIGS. 1-6.

Referring to FIGS. 13 and 14, track 120 is an alternative to that shown in FIG. 7 (i.e. track 20). Track 120 is a U-shaped channel with parallel walls 120A and 120B interconnected by web 120C. Track 120 is designed to embrace the barrier 112/114 of previously mentioned panel 110, but not the cladding 116 and 118. Track 120 may be a strip of sheet metal, plastic, a structural composite, thin plywood, etc., which is bent or fashioned to form parallel walls 120A and 120B.

As shown in FIG. 14, track 120 can be installed on structure 54, which may be a floor, ceiling, wall, or another panel similar to panel 110. Track 120 is secured by driving self-tapping screws 52 through web 120C and into structure 54.

Next panel 110 is positioned with (a) wall 120A aligned with the joint between cladding 118 and stratum 114, and (b) wall 120B aligned with the joint between cladding 116 and stratum 112. Thereafter, panel 110 may be pushed or tapped to embed inserts 120A and 120B as illustrated. Finally, self-tapping screws 50 are driven through cladding 118 and 116 into walls 120A and 120B, respectively.

It is appreciated that various modifications may be implemented with respect to the above described embodiments. Instead of tracks, the panels may be installed against existing vertical structure in a building, e.g., on the inside of an exterior wall. Also, the panels can be installed in tracks built into a building structure and covered with molding. Also, panels may be stacked and secured in place as a stack to enhance rigidity, soundproofing, etc. In some cases the panels may be mounted in a horizontal plane. Panels may also be used as part of a cabinet, built-in shelf, or other architectural feature. In some embodiments, the panel may be sealed and used for outside applications.

Obviously, many modifications and variations of the present invention are possible in light of the above teachings. It is therefore to be understood that within the scope of the appended claims, the invention may be practiced otherwise than as specifically described.

The invention claimed is:

1. A panel comprising:
an insulating barrier having an opposing pair of sides, the insulating barrier including a first stratum and a second stratum each having an inside portion and an outside portion, the inside portion of the first and the second stratum having a first plurality of ridges and a second plurality of ridges, respectively, each of the ridges of the first stratum extending to meet more than one of the plurality of ridges of the second stratum, the outside portion of the first stratum being an externally flat unbreached layer supporting and being formed of the same material as the first plurality of ridges, the outside portion of the second stratum being an externally flat unbreached layer supporting and being formed of the same material as the second plurality of ridges, the first and the second plurality of ridges facing each other, the first plurality of ridges running athwart the second plurality of ridges, one or more adjacent pairs of the first plurality of ridges having between them clearance providing a mechanical chase across at least most of the panel;
a cladding overlaying the insulating barrier on at least one of the opposing pair of sides, the cladding having a density exceeding that of the first and the second stratum; and
a plurality of cleats edge-mounted to embrace the insulating barrier without embracing the cladding, the plurality of cleats each including a U-shaped channel, the plurality of cleats being adapted to be attached to an adjoining structure.

2. A panel according to claim 1, the panel being adapted to connect to a complementary member having a complementary barrier that is clad with a complementary material, the panel comprising:
an insert having a pair of wings, a first one of the pair of wings being inserted between the insulating barrier and the cladding, and a second one of the wings being adapted to be inserted between the complementary barrier and the complementary material.

3. A panel according to claim 2 wherein the pair of wings are perpendicular to each other, the panel and the complementary member being joined at a bevel joint, the insert being elongated and extending over most of the bevel joint.

* * * * *